US 8,441,480 B2

(12) United States Patent
Nagamine

(10) Patent No.: US 8,441,480 B2
(45) Date of Patent: May 14, 2013

(54) INFORMATION PROCESSING APPARATUS, INFORMATION PROCESSING SYSTEM, AND COMPUTER READABLE MEDIUM

(75) Inventor: Takeshi Nagamine, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 647 days.

(21) Appl. No.: 12/418,163

(22) Filed: Apr. 3, 2009

(65) Prior Publication Data

US 2010/0123687 A1 May 20, 2010

(30) Foreign Application Priority Data

Nov. 14, 2008 (JP) ................................. 2008-292836

(51) Int. Cl.
*G06T 17/00* (2006.01)

(52) U.S. Cl.
USPC ............................ 345/420; 345/419; 345/179

(58) Field of Classification Search ........................ None
See application file for complete search history.

(56) References Cited

U.S. PATENT DOCUMENTS

| 6,577,330 B1 | 6/2003 | Tsuda et al. | |
| 6,999,073 B1 * | 2/2006 | Zwern et al. ................. | 345/420 |
| 2003/0210244 A1 * | 11/2003 | Sasago et al. ................. | 345/419 |
| 2004/0145585 A1 | 7/2004 | Fontius | |
| 2006/0170870 A1 * | 8/2006 | Kaufman et al. ............... | 353/28 |
| 2006/0285089 A1 * | 12/2006 | Higashi .......................... | 353/101 |
| 2008/0246943 A1 * | 10/2008 | Kaufman et al. ............. | 356/5.01 |
| 2008/0267454 A1 * | 10/2008 | Kobayashi et al. ........... | 382/106 |

FOREIGN PATENT DOCUMENTS

| CN | 1274439 A | 11/2000 |
| CN | 1504965 A | 6/2004 |
| JP | A-8-123983 | 5/1996 |
| JP | A-2007-34981 | 2/2007 |

OTHER PUBLICATIONS

Aug. 30, 2012 Office Action issued in Chinese Patent Application No. 200910140988.0 (with English Translation).
Aug. 30, 2012 Search Report issued in Chinese Patent Application No. 200910140988.0 (with English Translation).

* cited by examiner

*Primary Examiner* — Joseph Haley
*Assistant Examiner* — Ifedayo Iluyomade
(74) *Attorney, Agent, or Firm* — Oliff & Berridge, PLC

(57) ABSTRACT

An information processing apparatus includes: an acquisition portion that acquires position/direction information indicative of a position and a direction of a projection device; a selection portion that selects at least one piece of drawing data from a plurality of pieces of drawing data relating to parts provided in an object; a generation portion that generates a projection drawing from the drawing data selected by the selection portion; a conversion portion that calculates a distance between the object and the projection device, and a direction of the projection device from the position/direction information, and converts the projection drawing into a perspective drawing by using the calculated distance and the calculated direction; and a control portion that controls the projection device so as to project the perspective drawing onto the object.

11 Claims, 11 Drawing Sheets

FIG. 2

| PART NAME | POSITION INFORMATION | CAD DATA |
|---|---|---|
| A | position 1 | data 1 |
| B | position 2 | data 2 |
| ⋮ | ⋮ | ⋮ |

INFORMATION PROCESSING APPARATUS, INFORMATION PROCESSING SYSTEM, AND COMPUTER READABLE MEDIUM

CROSS-REFERENCE TO RELATED APPLICATION

This application is based on and claims priority under 35 USC 119 from Japanese Patent Application No. 2008-292836 filed Nov. 14, 2008.

BACKGROUND

1. Technical Field

This invention relates to an information processing apparatus, an information processing system, and computer readable medium.

2. Related Art

There has been conventionally known a display device that displays at all times a front view, a side view, and a bottom view of a given part of an object on respective windows displaying different projection planes, and makes a slave window follow the movement of a main window.

In addition, there has been known a technique for reducing sense of discomfort between vision relating to a virtual object and tactual sensation relating to an object when the object which can be handled by a user is to be overlapped with the virtual object according to CAD data.

SUMMARY

According to an aspect of the present invention, there is provided an information processing apparatus including: an acquisition portion that acquires position/direction information indicative of a position and a direction of a projection device; a selection portion that selects at least one piece of drawing data from a plurality of pieces of drawing data relating to parts provided in an object; a generation portion that generates a projection drawing from the drawing data selected by the selection portion; a conversion portion that calculates a distance between the object and the projection device, and a direction of the projection device from the position/direction information, and converts the projection drawing into a perspective drawing by using the calculated distance and the calculated direction; and a control portion that controls the projection device so as to project the perspective drawing onto the object.

BRIEF DESCRIPTION OF THE DRAWINGS

Exemplary embodiments of the present invention will be described in detail based on the following figures, wherein:

FIG. 2 is a diagram showing an example of a database stored into a storage unit 15;

DETAILED DESCRIPTION

A description will now be given, with reference to the accompanying drawings, of exemplary embodiments of the present invention.

Figure 1:
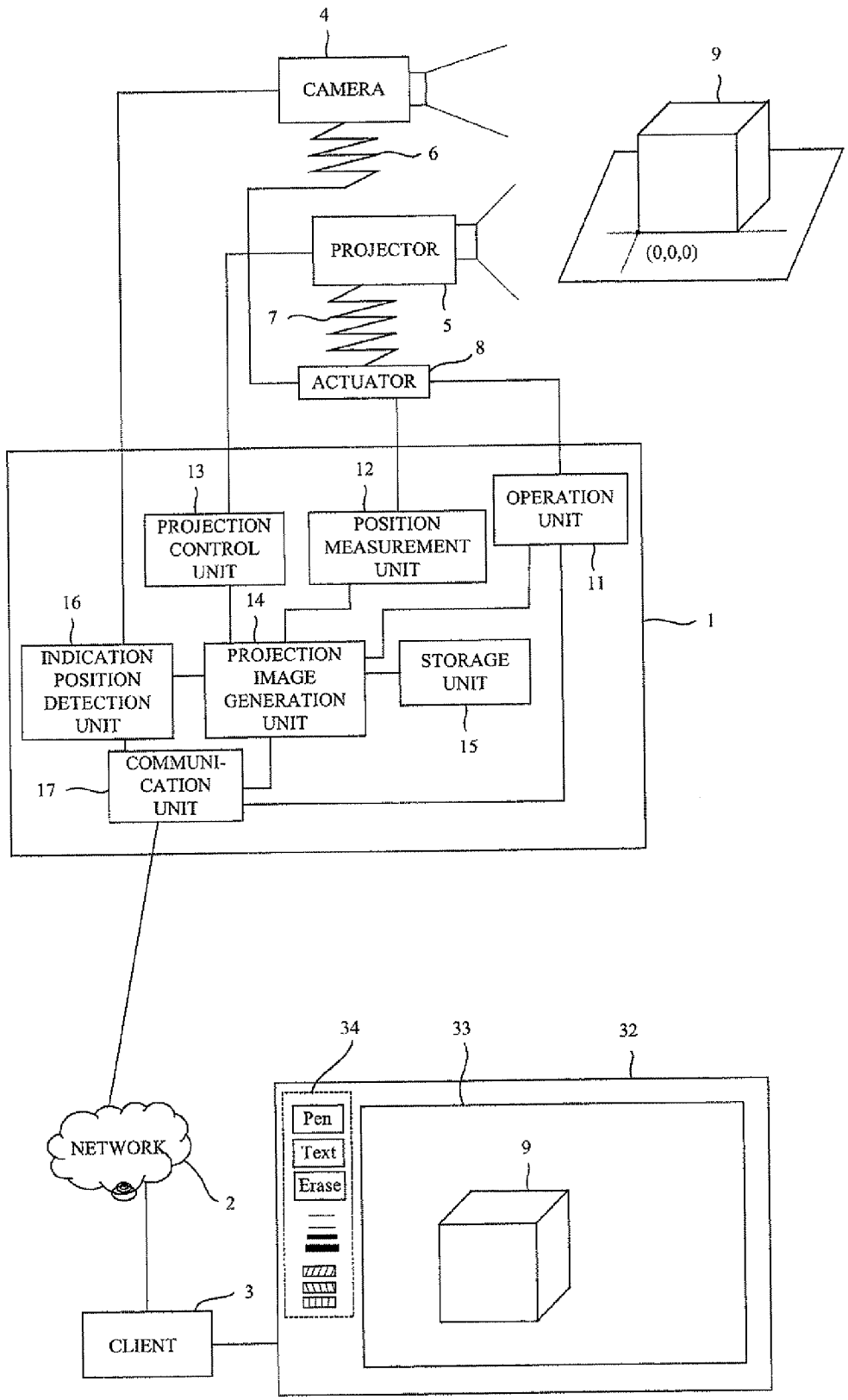
FIG. 1 is a block diagram showing the structure of an information processing system in accordance with an exemplary embodiment of the present invention.

FIG. 1 is a block diagram showing the structure of an information processing system in accordance with an exemplary embodiment of the present invention.

The information processing system in FIG. 1 includes a server 1 (a first information processing apparatus), and a client 3 (a second information processing apparatus). These elements are connected to each other via a network 2. Based on a control command from the server 1, the projector 5 projects an annotation image or CAD data (drawing data) onto an object 9. It should be noted that the annotation image includes an image of any types such as a line, a character, a symbol, a figure, a color, and a font. The object 9 is set up at a reference position ((x, y, z)=(0, 0, 0)), as shown in FIG. 1.

An arm 6 moving a camera 4 from side to side or up and down is connected to the camera 4, and an arm 7 moving the projector 5 from side to side or up and down is connected to the projector 5. An actuator 8 driving the arms 6 and 7 is connected to the arms 6 and 7. The camera 4 and the projector 5 move by the arms 6 and 7, respectively, and move such that angles of view and optical axes of the camera 4 and the projector 5 are identical with each other.

The server 1 includes an operation unit 11 (a selection portion), a position measurement unit 12, a projection control unit 13 (a control portion), a projection image generation unit 14 (an acquisition portion, a generation portion, and a conversion portion), a storage unit 15, an indication position detection unit 16 (a detection portion), and a communication unit 17. The projection image generation unit 14 is connected to the operation unit 11, the position measurement unit 12, the projection control unit 13, the storage unit 15, the indication position detection unit 16, and the communication unit 17. The operation unit 11 and the position measurement unit 12 are connected to the actuator 8, and the projection control unit 13 is connected to the projector 5. The indication position detection unit 16 is connected to the camera 4.

The operation unit 11 inputs an operation indication moving the arm 6 and/or the arm 7 to the actuator 8. The operation indication moving the arm 6 and/or the arm 7 may be input from the client 3 to the actuator 8 via the network 2, the communication unit 17, and the operation unit 11. In addition, the operation unit 11 is used when the CAD data stored into the storage unit 15 is selected.

The position measurement unit 12 measures positions of the camera 4 and the projector 5 based on a driving signal generated by the driving of the actuator 8. The storage unit 15 stores three dimensional CAD (Computer Aided Design) data (e.g. data of design drawings) of parts included in the object 9 (hereinafter, the three dimensional CAD data is simply referred to as "CAD data"). In addition, the storage unit 15 includes a database in which a part name, position/direction information representing a position and a direction of the part, and the CAD data are associated with each other, as shown in FIG. 2. Specifically, the position/direction information is represented by three dimensional coordinates. Moreover, a plurality of pieces of CAD data (i.e., the pieces of CAD data relating to an X-plane, a Y-plane, and a Z-plane) are set for a single part. It should be noted that the pieces of CAD data, the database, and other data stored into the storage unit 15 may be stored into an external storage device (not shown) of the server 1.

The projection image generation unit 14 generates perspective drawings as the projection images (here, CAD data) when the object 9 is viewed from the position of the projector 5, based on the position/direction information of the projector 5 measured by the position measurement unit 12 and the pieces of CAD data stored into the storage unit 15. The perspective drawing shows a diagram which is drawn together with a perspective when something is drawn on a plane of two dimensions.

The projection control unit 13 receives the perspective drawings generated by the projection image generation unit 14, and causes the projector 5 to project the perspective drawings. The indication position detection unit 16 receives a capture image transmitted from the camera 4, and detects a position of a specific light source (i.e., a color) included in the received capture image. The indication position detection unit 16 transmits the received capture image to the client 3 via the communication unit 17. In addition, the indication position detection unit 16 may stores the received capture image into the storage unit 15.

A display device 32 is connected to the client 3, and displays a window 33 displaying the capture image transmitted from the communication unit 17, and a user interface (UI) 34 to write in the annotation image. The UI 34 includes a group of buttons such as a pen button, a text button, and an erase button, and icons defined by lines and colors. For example, when the pen button of the UI 34 is depressed to draw the annotation image onto the object 9 in the window 33, the annotation image is output from the client 3 to the projector 5 via the server 1. The projector 5 draws the annotation image onto the object 9 based on the data on the annotation image (specifically, coordinate data).

Figure 3:
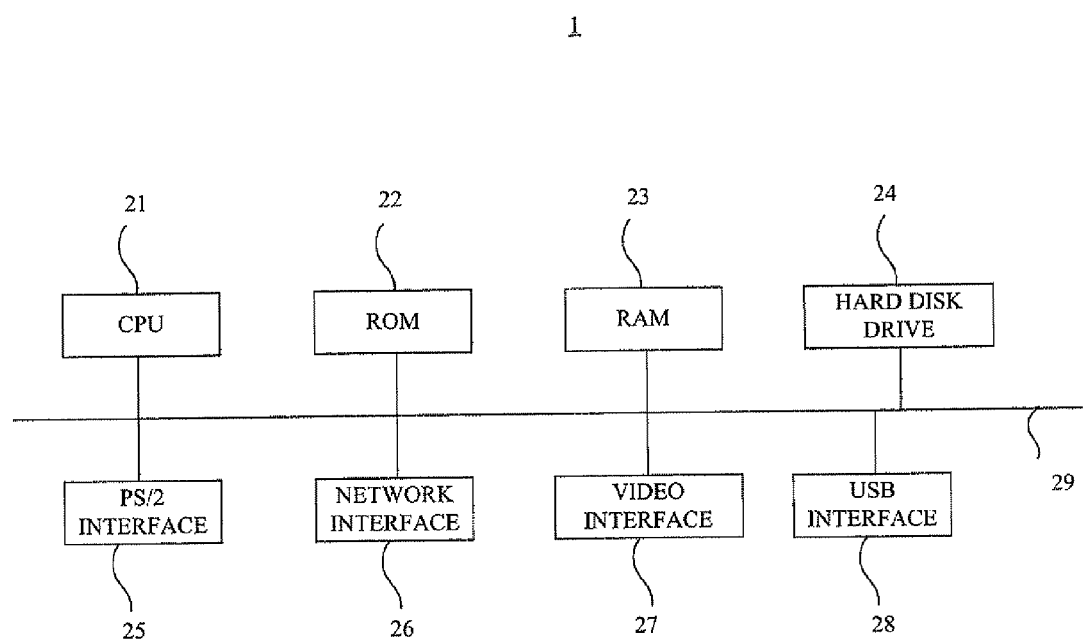
FIG. 3 is a block diagram showing the hardware structure of a server 1 and a client 3.

FIG. 3 is a block diagram showing the hardware structure of the server 1 and the client 3.

Since the hardware structure of the client 3 is the same as that of the server 1, a description will now be given of the hardware structure of the server 1 hereinafter.

The server 1 includes: a CPU 21 that controls the entire server 1; a ROM 22 that stores control programs; a RAM 23 that functions a working area; a hard disk drive (HDD) 24 that stores various information and programs; a PS/2 interface 25 that connects a mouse and a keyboard; a network interface 26 that is connected to other computers; a video interface 27 that is connected to the display device; and a USB (Universal Serial Bus) interface 28 that is connected to a USB device, not shown. The CPU 21 is connected to the ROM 22, the RAM 23, the HDD 24, the PS/2 interface 25, the network interface 26, the video interface 27 and the USB interface 28 via a system bus 29.

The operation unit 11 corresponds to the mouse and the keyboard, not shown. The position measurement unit 12, the projection control unit 13, the storage unit 15, and the indication position detection unit 16 correspond to the CPU 21. The storage unit 15 corresponds to the ROM 22, the RAM 23, and the HDD 24. The communication unit 17 corresponds to the network interface 26.

Hereafter, it is assumed that, in each process, the user of the side of the object 9 sets the object 9 to the reference position (x, y, z)=(0, 0, 0) in advance.

Figure 4:
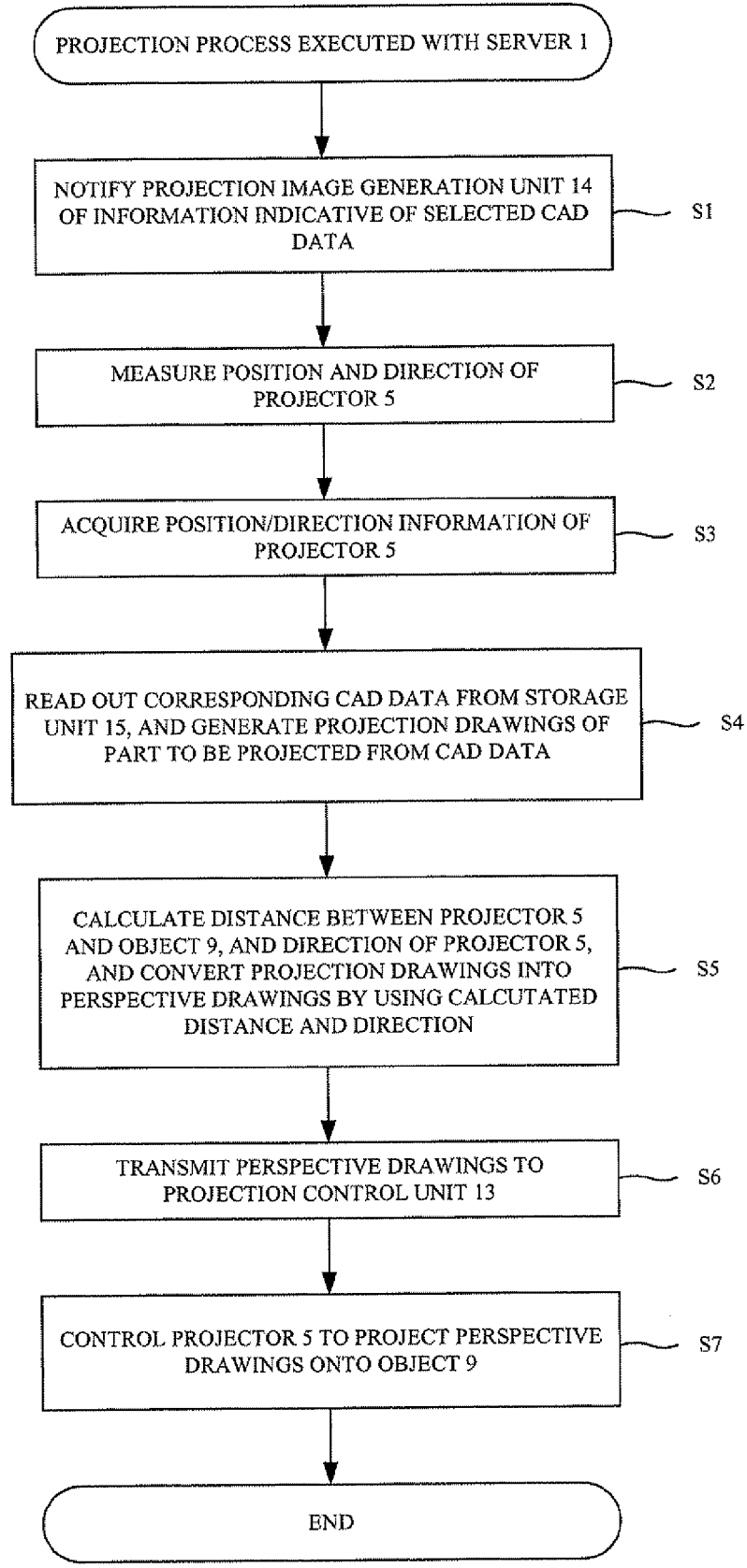
FIG. 4 is a flowchart showing a projection process executed with the server 1.

FIG. 4 is a flowchart showing a projection process executed with the server 1.

First, when the CAD data corresponding to the part provided in the object 9 is selected by the operation unit 11, the operation unit 11 notifies the projection image generation unit 14 of information indicative of the selected CAD data (step S1). Next, the position measurement unit 12 measures the position and the direction of the projector 5 from the driving signal of the actuator 8 (step S2). The projection image generation unit 14 acquires the position/direction information of the projector 5 from the position measurement unit 12 (step S3).

Figure 5A:
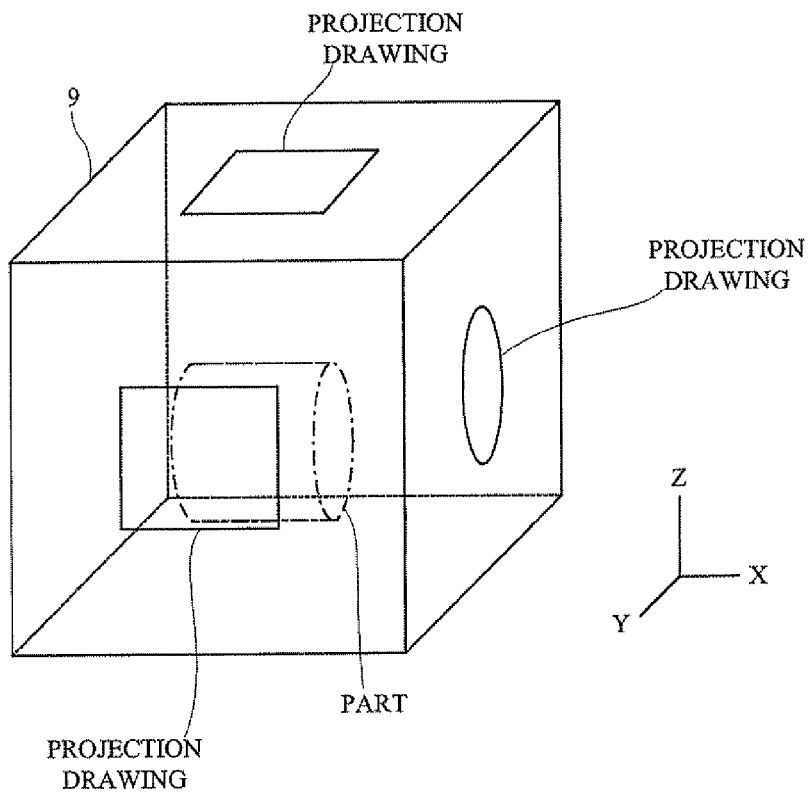
FIG. 5A is a diagram where a part to be projected is moved in parallel with each of XYZ directions, and outlines of the part are drawn on outer baileys of an object 9.

The projection image generation unit 14 reads out corresponding CAD data from the storage unit 15 based on the information indicative of the CAD data notified in step S1, and generates projection drawings of the part to be projected from the CAD data (step S4). FIG. 5A shows an example of the projection drawings. The projection drawings are diagrams where the part to be projected is moved in parallel with each of XYZ directions, and outlines of the part are drawn on outer baileys of the object 9.

Next, the projection image generation unit 14 calculates a distance between the projector 5 and the object 9, and the direction of the projector 5 from the position/direction information of the projector 5 acquired in step S3, and converts the projection drawings into the perspective drawings by using the distance between the projector 5 and the object 9, and the direction of the projector 5 (step S5) The projection image generation unit 14 transmits the perspective drawings to the projection control unit 13 (step S6).

Figure 5B:
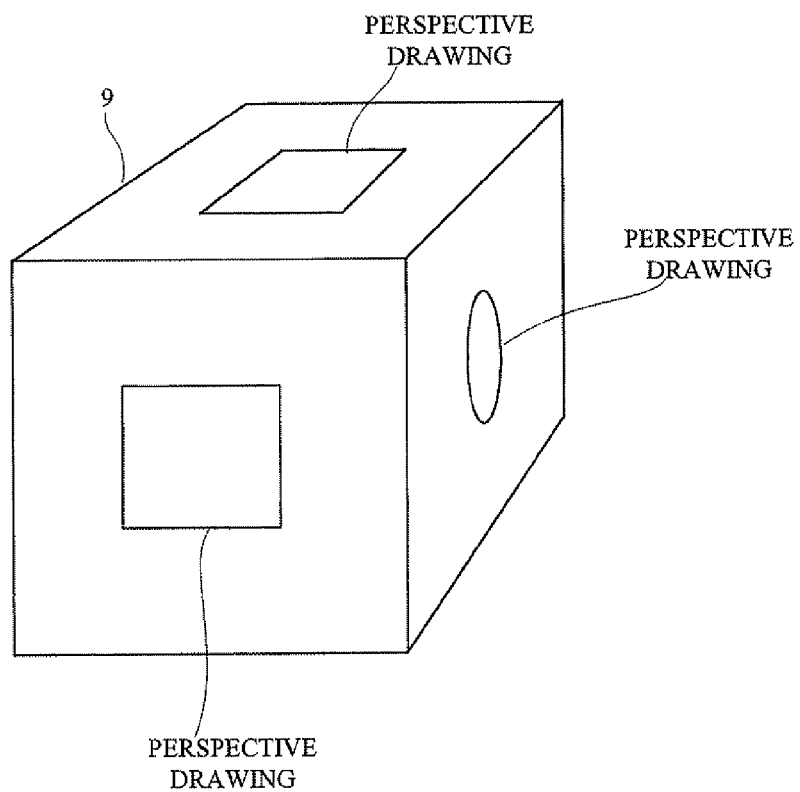
FIG. 5B is a diagram showing the object 9 onto which perspective drawings are projected.

The projection control unit 13 receives the perspective drawings, and controls the projector 5 to project the perspective drawings onto the object 9 (step S7). The present process is terminated. Thereby, the perspective drawings are projected onto the object 9. FIG. 5B shows the object 9 onto which the perspective drawings are projected.

According to the present process, when the user of the side of the object 9 observes the part included in the object 9 and the CAD data of the part, a point of view need not be switched between the part and the CAD data. That is, the user observes the part and the CAD data by the same point of view.

Although in the above-mentioned process, the CAD data corresponding to the part provided in the object 9 is selected by the operation unit 11, the CAD data corresponding to the part provided in the object 9 may be selected from the client 3. In this case, the CPU 31 of the client 3 notifies the projection image generation unit 14 of the information indicative of the CAD data.

Figure 6:
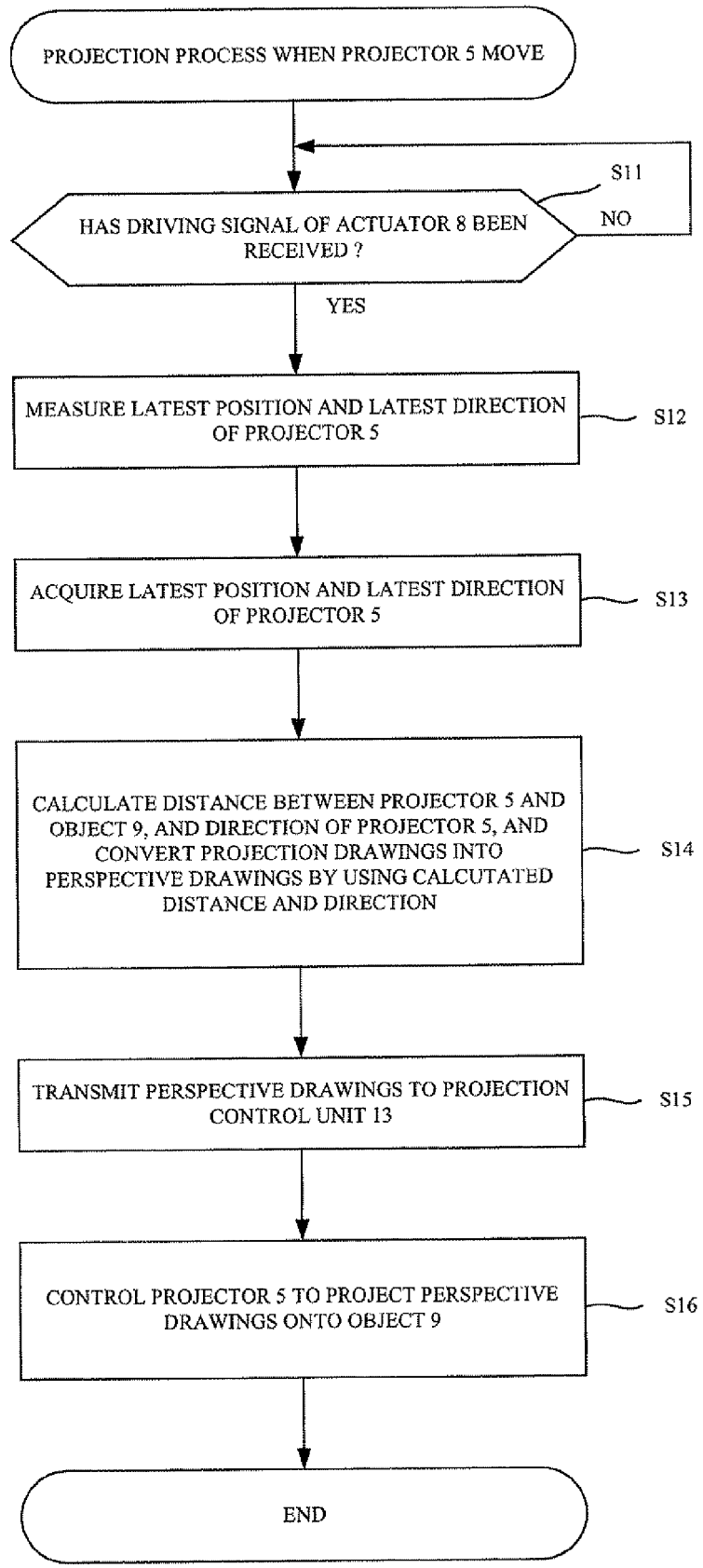
FIG. 6 is a flowchart showing the projection process when a projector 5 moves.
Figure 7:
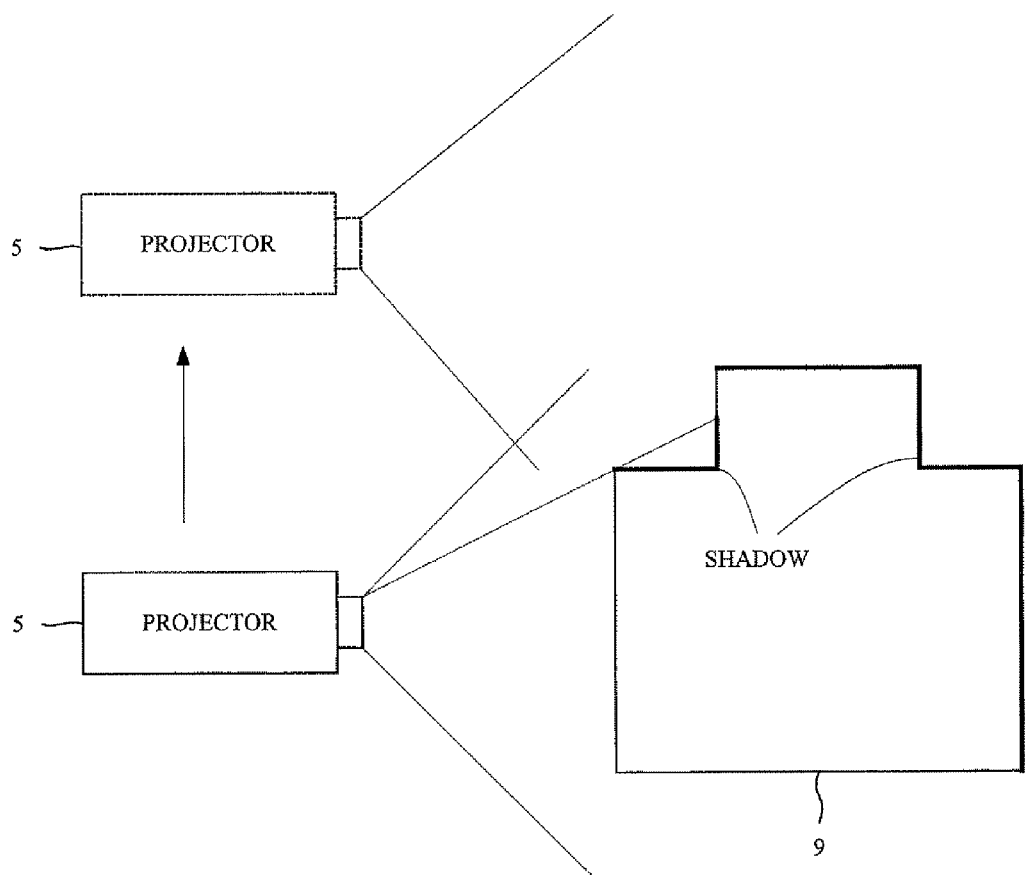
FIG. 7 is a diagram showing an arrangement relationship between the projector 5 and the object 9.

FIG. 6 is a flowchart showing the projection process when the projector 5 moves, and FIG. 7 is a diagram showing an arrangement relationship between the projector 5 and the object 9. It is assumed that, in the present process, the process in FIG. 4 is executed in advance.

The position measurement unit 12 determines whether the driving signal of the actuator 8 generated by the movement of the projector 5 has been received (step S11). When the answer to the determination of step S11 is "NO", the procedure repeats the determination. On the other hand, when the answer to the determination of step S11 is "YES", the position measurement unit 12 measures the latest position and the latest direction of the projector 5 from the driving signal of the actuator 8 (step S12). The projection image generation unit 14 acquires the latest position and the latest direction of the projector 5 from the position measurement unit 12 (step S13).

The projection image generation unit 14 calculates the distance between the projector 5 and the object 9, and the direction of the projector 5 from the position/direction information of the projector 5 acquired in step S13, and converts the projection drawings into the perspective drawings by using the distance between the projector 5 and the object 9, and the direction of the projector 5 (step S14). The projection image generation unit 14 transmits the perspective drawings to the projection control unit 13 (step S15). It should be noted that the projection image generation unit 14 generates the projection drawings in step S4 of FIG. 4, and hence the regeneration of the projection drawings is not executed.

The projection control unit 13 receives the perspective drawings, and controls the projector 5 to project the perspective drawings onto the object 9 (step S16). The present process is terminated. Thereby, the perspective drawings are projected onto the object 9.

According to the present process, the perspective drawings are also projected onto shadow areas of the object 9 by the movement of the projector 5, as shown in FIG. 7.

Figure 8:
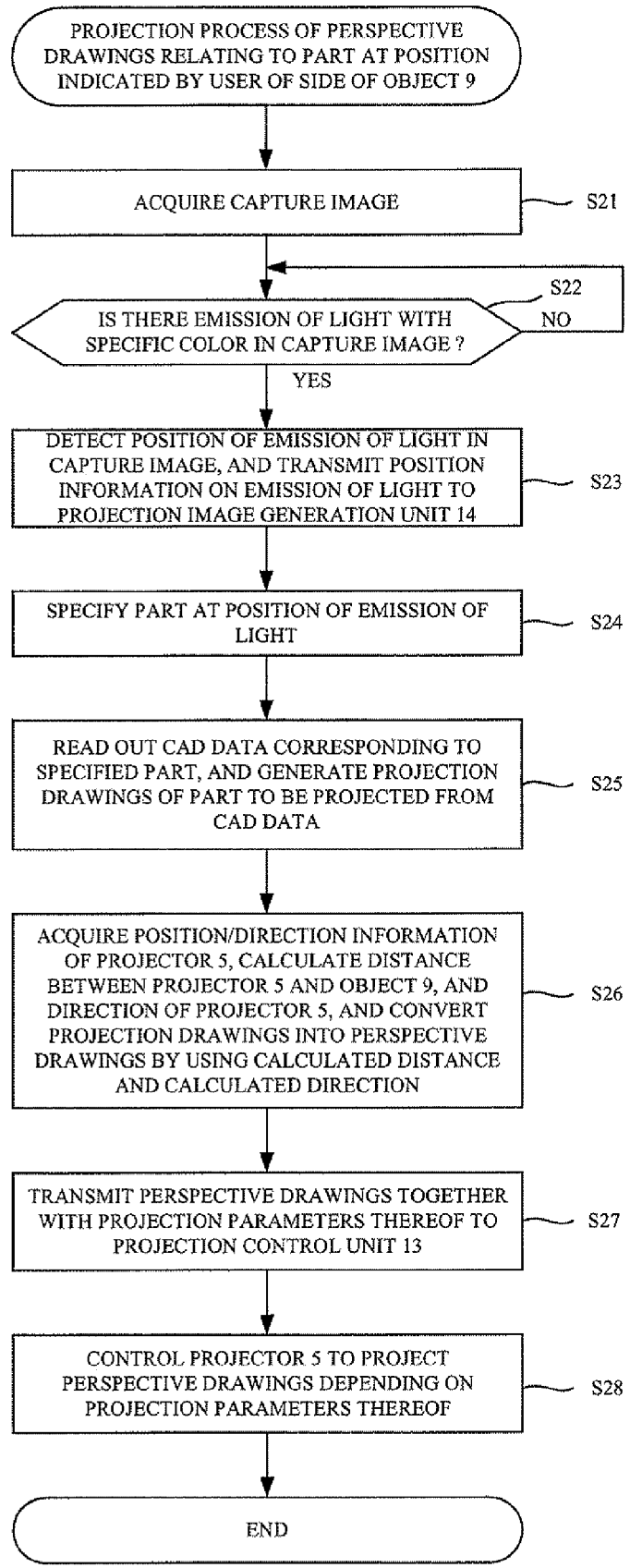
FIG. 8 is a flowchart showing the projection process of the perspective drawings relating to a part at a position indicated by a user of a side of the object 9.
Figure 9:
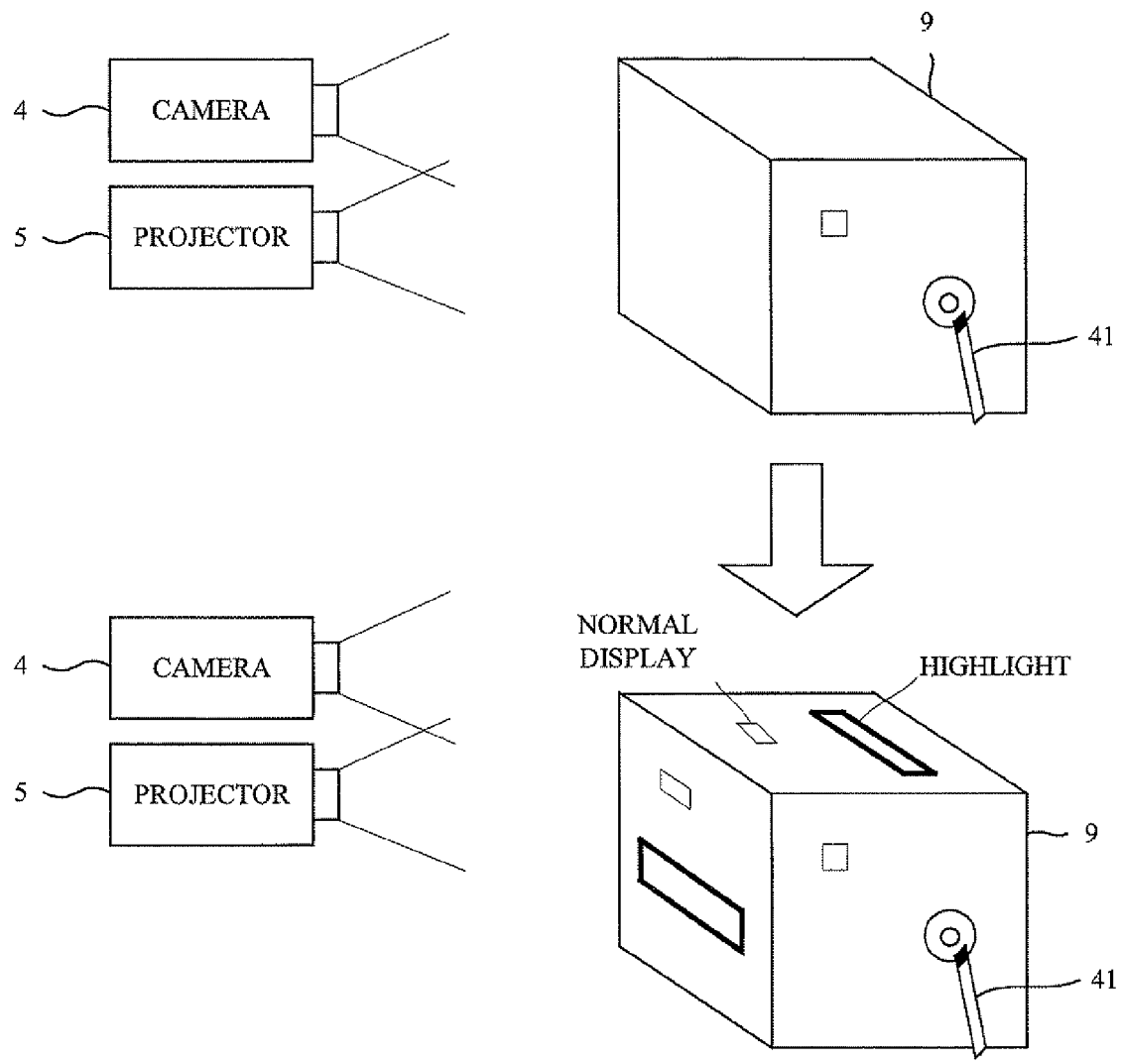
FIG. 9 is a diagram showing a state where highlighted perspective drawings are projected.

FIG. 8 is a flowchart showing the projection process of the perspective drawings relating to the part at the position indicated by the user of the side of the object 9. FIG. 9 is a diagram showing a state where highlighted perspective drawings are projected. It is assumed that, in the present process, the user of the side of the object 9 makes an indication device 41 emitting a light with a specific color (e.g. a red color) come into contact with the object 9, and indicates the position on the object 9.

The indication position detection unit 16 acquires the capture image from the camera 4 (step S21), and determines whether there is an emission of the light with the specific color (e.g. the red color) in the capture image (step S22).

When the answer to the determination of step S22 is "NO", the procedure repeats the determination. On the other hand, when the answer to the determination of step S22 is "YES", the indication position detection unit 16 detects the position of the emission of the light in the capture image, and transmits position information on the emission of the light to the projection image generation unit 14 (step S23).

The projection image generation unit 14 specifies the part at the position of the emission of the light based on the position information on the emission of the light transmitted from the indication position detection unit 16, and the database in FIG. 2 stored into the storage unit 15 (step S24).

Then, the projection image generation unit 14 reads out the CAD data corresponding to the specified part from the storage unit 15, and generates the projection drawings of the part to be projected from the CAD data (step S25).

Next, the projection image generation unit 14 acquires the position/direction information of the projector 5 from the position measurement unit 12, calculates the distance between the projector 5 and the object 9, and the direction of the projector 5 from the position/direction information of the projector 5, and converts the projection drawings into the perspective drawings by using the distance between the projector 5 and the object 9, and the direction of the projector 5 (step S26). The projection image generation unit 14 transmits the perspective drawings together with projection parameters thereof to the projection control unit 13 (step S27). The projection parameters of the perspective drawings are parameters highlighting the perspective drawings, such as parameters changing the colors of the perspective drawings, parameters blinking the perspective drawings, and parameters changing a type of lines in the perspective drawings to heavy line.

The projection control unit 13 receives the perspective drawings together with the projection parameters thereof, and controls the projector 5 to project the perspective drawings depending on the projection parameters thereof (step S28). The present process is terminated. Thereby, the perspective drawings are projected onto the object 9.

According to the present process, even if the perspective drawings of another part are projected onto the object 9 as shown in FIG. 9, only the perspective drawings of the part indicated by the user of the side of the object 9 are highlighted.

Although in the present process, the user of the side of the object 9 makes the indication device 41 come into contact with the object 9, and indicates the position on the object 9, a user of the client 3 may indicate the position on the object 9 by adding a mark to an image of the object 9 displayed on the display device 32. In this case, the indication position detection unit 16 comprehends the position on the object 9 indicated by the user of the client 3 by acquiring position information of the mark from the client 3.

Figure 10:
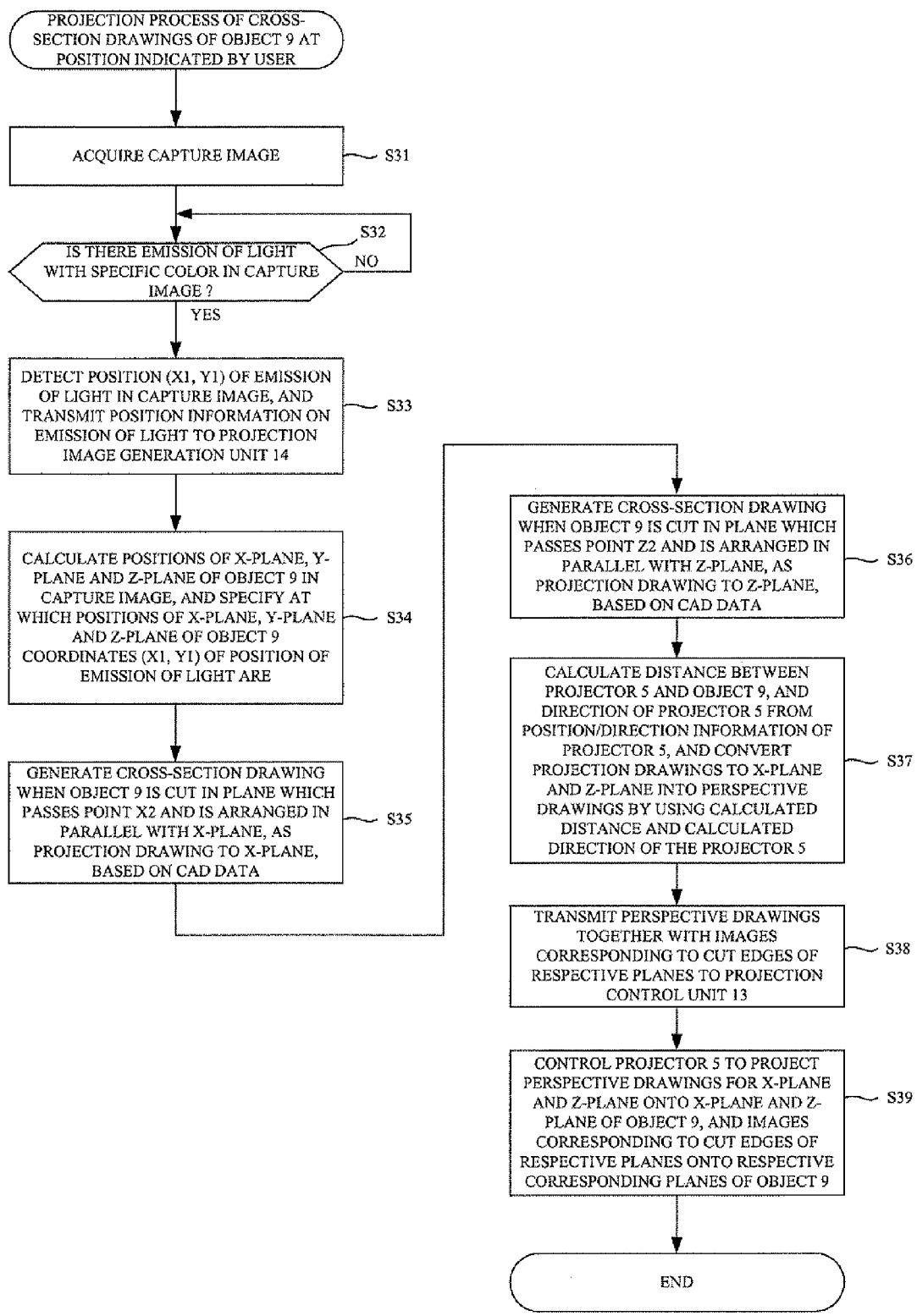
FIG. 10 is a flowchart showing the projection process of cross-section drawings of the object 9 at a position indicated by the user.
Figure 11:
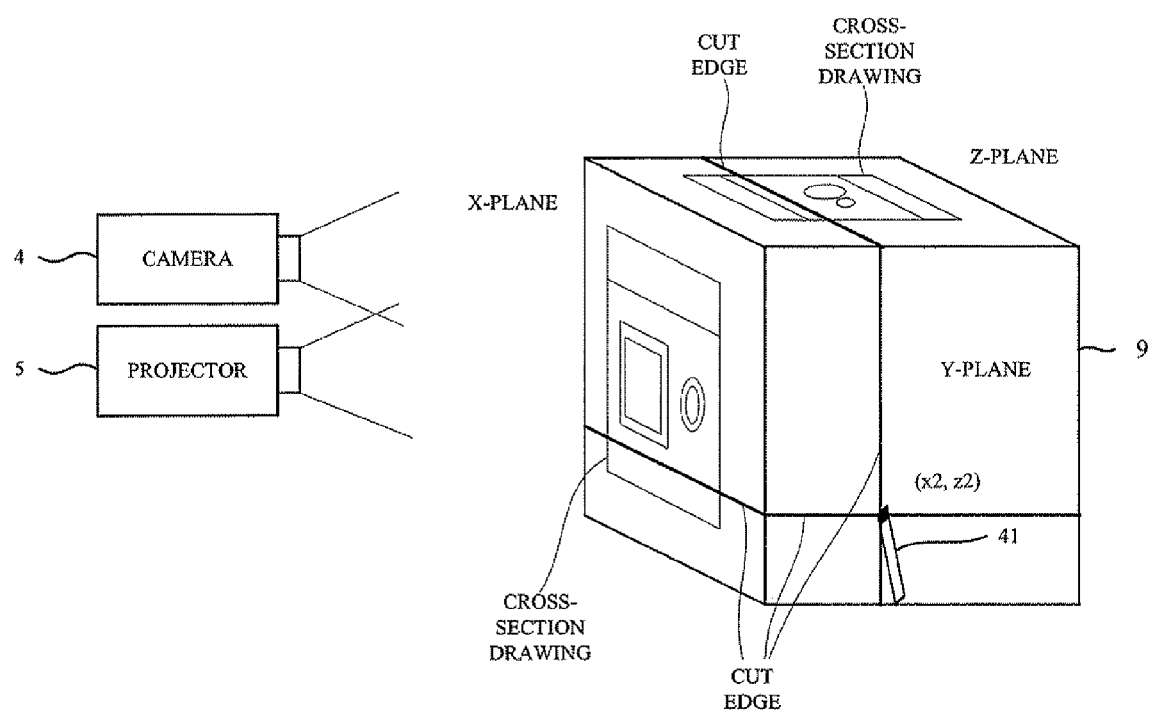
FIG. 11 is a diagram showing a state where the cross-section drawings of the object 9 are projected.

FIG. 10 is a flowchart showing the projection process of cross-section drawings of the object 9 at the position indicated by the user. FIG. 11 is a diagram showing a state where the cross-section drawings of the object 9 are projected. It is assumed that, in the present process, the user of the side of the object 9 makes an indication device 41 emitting a light with a specific color (e.g. a red color) come into contact with the object 9, and indicates the position on the object 9.

The indication position detection unit 16 acquires the capture image from the camera 4 (step S31), and determines whether there is an emission of the light with the specific color (e.g. the red color) in the capture image (step S32).

When the answer to the determination of step S32 is "NO", the procedure repeats the determination. On the other hand, when the answer to the determination of step S32 is "YES", the indication position detection unit 16 detects the position of the emission of the light in the capture image, and transmits position information on the emission of the light to the projection image generation unit 14 (step S33). Here, it is assumed that the coordinates of the position of the emission of the light are (x1, y1).

The projection image generation unit 14 calculates the positions of the X-plane, the Y-plane and the Z-plane of the object 9 in the capture image based on the position/direction information of the projector 5 acquired from the position measurement unit 12, and specifies at which positions of the X-plane, the Y-plane and the Z-plane of the object 9 the coordinates (x1, y1) of the position of the emission of the light are (step S34). Here, it is assumed that the coordinates of the position of the emission of the light are at (X2, Z2) on the Y-plane.

Next, the projection image generation unit 14 generates a cross-section drawing when the object 9 is cut in a plane which passes a point x2 and is arranged in parallel with the x-plane, as the projection drawing to the X-plane, based on the CAD data of the part corresponding to the point x2, stored into the storage unit 15 (step S35). Similarly, the projection image generation unit 14 generates a cross-section drawing when the object 9 is cut in a plane which passes a point z2 and is arranged in parallel with the z-plane, as the projection drawing to the z-plane, based on the CAD data of the part corresponding to the point z2, stored into the storage unit 15 (step S36).

The projection image generation unit 14 calculates the distance between the projector 5 and the object 9, and the direction of the projector 5 from the position/direction information of the projector 5 acquired from the position measurement unit 12, and converts the projection drawings to the X-plane and the Z-plane into the perspective drawings by using the distance between the projector 5 and the object 9, and the direction of the projector 5 (step S37). The projection image generation unit 14 transmits the perspective drawings together with images corresponding to cut edges of the respective planes to the projection control unit 13 (step S38).

The projection control unit 13 receives the perspective drawings together with the images corresponding to cut edges of the respective planes, and controls the projector 5 to project the perspective drawings for the X-plane and the Z-plane onto the X-plane and the Z-plane of the object 9, and the images corresponding to cut edges of the respective planes onto the respective corresponding planes of the object 9 (step S39). The present process is terminated. Thereby, the perspective drawings and the images corresponding to cut edges of the respective planes are projected onto the outer baileys of the object 9 which are arranged in parallel with the planes cutting the object 9 at the position indicated by the user.

According to the present process, the cross-section drawings of the object 9 at the position indicated by the user and the images corresponding to cut edges of the respective planes are projected onto the object 9, as shown in FIG. 11.

Although in the present process, the user of the side of the object 9 makes the indication device 41 come into contact with the object 9, and indicates the position on the object 9, a user of the client 3 may indicate the position on the object 9 by adding a mark to an image of the object 9 displayed on the display device 32. In this case, the indication position detection unit 16 comprehends the position on the object 9 indicated by the user of the client 3 by acquiring position information of the mark from the client 3.

Although in the present process, the planes cutting the object 9 at the position indicated by the user are arranged in parallel with the outer baileys of the object 9 onto which the cross-section drawings are projected (i.e., the x-plane is arranged in parallel with the plane passing the point x2, and the z-plane is arranged in parallel with the plane passing the point z2), the planes cutting the object 9 at the position indicated by the user may be arranged in substantially parallel with the outer baileys of the object 9 onto which the cross-section drawings are projected. The substantial parallel shows the case where the plane cutting the object 9 at the position indicated by the user is inclined by a given angle (e.g. 0 to 5 degrees) with respect to the outer bailey of the object 9 onto which the cross-section drawing is projected.

As described in detail above, according to the exemplary embodiment, the projection image generation unit 14 acquires the position/direction information indicative of the position and the direction of the projector 5, and the operation unit 11 selects at least one piece of CAD data from the plurality of pieces of CAD data relating to the parts provided in the object 9. Further, the projection image generation unit 14 generates the projection drawing from the CAD data selected by the operation unit 11, calculates the distance between the object 9 and the projector 5, and the direction of the projector 5 from the position/direction information, and converts the projection drawing into the perspective drawing by using the calculated distance and the calculated direction. The projection control unit 13 controls the projector 5 to project the perspective drawing onto the object 9. Therefore, the drawing of the selected part is displayed on the object 9 with high accuracy.

Although in the above-mentioned exemplary embodiment, the process in FIG. 8 and the process in FIG. 10 are described separately, these processes may be combined with each other. Thereby, only the cross-section drawing of a certain part is highlighted.

Although in the present exemplary embodiment, it is preferable that angles of view and optical axes of the camera 4 and the projector 5 are identical with each other, the projection image generation unit 14 performs calibration, so that a specific position of the capture image may be converted into a specific position of the projection image.

When the aberration of lens included in the camera 4 and the projector 5 are set in advance, the projection image generation unit 14 may generate the projection image in view of the aberration of lens. In addition, in the present exemplary embodiment, the object 9 may be composed of a real thing, or a mock made from a paper or a resin, or the like.

Although the information processing system in FIG. 1 includes a single camera and a single projector, the information processing system may include a plurality of cameras and a plurality of projectors. In this case, the position measurement unit 12 may measure the position and the direction of each projector assign the projection image to each projector. Alternatively, the assignment of the projection surfaces of the object 9 is set to each projector in advance by the operation unit 11, and the position measurement unit 12 may control the position and the direction of each projector. In this case, setting information by the operation unit 11 is transmitted to the position measurement unit 12 via the projection image generation unit 14.

A recording medium on which the software program for realizing the functions of the server 1 is recorded may be supplied to the server 1, and the CPU 21 may read and execute the program recorded on the recording medium. In this manner, the same effects as those of the above-described exemplary embodiment can be achieved. The recording medium for providing the program may be a CD-ROM, a DVD, or a SD card, for example.

Alternatively, the CPU 21 of the server 1 may execute a software program for realizing the functions of the server 1, so as to achieve the same effects as those of the above-described exemplary embodiment.

It should be noted that the present invention is not limited to those exemplary embodiments, and various modifications may be made to them without departing from the scope of the invention.

What is claimed is:

1. An information processing apparatus comprising: an acquisition portion that acquires position/direction information indicative of a position and a direction of a projection device; a selection portion that selects at least one piece of drawing data from a plurality of pieces of drawing data relating to parts provided in an object, the object covering at least portions of and being distinct from the parts; a generation portion that generates a projection drawing from the drawing data selected by the selection portion; a conversion portion that calculates a distance between the object and the projection device, and a direction of the projection device from the position/direction information, and converts the projection drawing into a perspective drawing by using the calculated distance and the calculated direction; and a control portion that controls the projection device so as to project the perspective drawing onto the object, wherein the acquisition portion acquires the position/direction information after the movement of the projection device from a movement device moving the projection device.

2. The information processing apparatus according to claim 1, wherein the conversion portion calculates the distance between the object and the projection device, and the direction of the projection device from the position/direction information after the movement of the projection device, and converts the projection drawing into the perspective drawing by using the calculated distance and the calculated direction.

3. The information processing apparatus according to claim 1, further comprising a detection portion that detects an indication position on the object by a user from a capture image of the object, wherein
the generation portion generates the projection drawing from the drawing data relating to a part corresponding to the indication position, and
the control portion controls the projection device so as to highlight the perspective drawing when the perspective drawing is projected onto the object.

4. The information processing apparatus according to claim 3, wherein the detection portion acquires the indication position on the object by the user from an external device connected to the information processing apparatus.

5. The information processing apparatus according to claim 1, further comprising a detection portion that detects an indication position on the object by a user from a capture image of the object, wherein
the generation portion generates a cross-section drawing when the object is cut in a plane passing the indication position, based on the drawing data relating to a part corresponding to the indication position,
the conversion portion calculates the distance between the object and the projection device, and the direction of the projection device from the position/direction information, and converts the cross-section drawing into the perspective drawing by using the calculated distance and the calculated direction, and
the control portion controls the projection device so as to project the perspective drawing onto an outer bailey of the object in parallel with or in substantially parallel with the plane passing the indication position.

6. The information processing apparatus according to claim 5, wherein the control portion controls the projection device so as to project the perspective drawing and an image corresponding to a cut edge of the indication position onto an outer bailey of the object in parallel with or in substantially parallel with the plane passing the indication position.

7. The information processing apparatus according to claim 5, wherein the detection portion acquires the indication position on the object by the user from an external device connected to the information processing apparatus.

8. An image processing system comprising: a second information processing apparatus that selects at least one of piece of drawing data from a plurality of pieces of drawing data relating to parts provided in an object, the object covering at least portions of and being distinct from the parts, and notifies a first information processing apparatus of information indicative of the selected drawing data; and the first information processing apparatus including: an acquisition portion that acquires position/direction information indicative of a position and a direction of a projection device; a generation portion that generates a projection drawing from the drawing data corresponding to the information notified from the second information processing apparatus; a conversion portion that calculates a distance between the object and the projection device, and a direction of the projection device from the position/direction information, and converts the projection drawing into a perspective drawing by using the calculated distance and the calculated direction; and a control portion that controls the projection device so as to project the perspective drawing onto the object, wherein the acquisition portion acquires the position/direction information after the movement of the projection device from a movement device moving the projection device.

9. A non-transitory computer readable medium causing a computer to execute a process, the process comprising: acquiring position/direction information indicative of a position and a direction of a projection device; selecting at least one piece of drawing data from a plurality of pieces of drawing data relating to parts provided in an object, the object covering at least portions of and being distinct from the parts; generating a projection drawing from the selected drawing data; calculating a distance between the object and the projection device, and a direction of the projection device from the position/direction information; converting the projection drawing into a perspective drawing by using the calculated distance and the calculated direction; and controlling the projection device so as to project the perspective drawing onto the object, wherein the acquisition portion acquires the position/direction information after the movement of the projection device from a movement device moving the projection device.

10. The information processing apparatus according to claim 1, wherein the projection drawing is a drawing for projecting outlines of a part to be projected onto outer baileys of the objects.

11. The information processing apparatus according to claim 1, further comprising a detection portion that detects an indication position on the object by a user from a capture image of the object, wherein
under a condition that the perspective drawing projected onto the object is related to a part corresponding to the indication position, the control portion controls the projection device so as to highlight the perspective drawing, and
under a condition that the perspective drawing projected onto the object is unrelated to the part corresponding to the indication position, the control portion controls the projection device so as to normally display the perspective drawing.

* * * * *